US012094041B2

(12) United States Patent
Xu et al.

(10) Patent No.: US 12,094,041 B2
(45) Date of Patent: Sep. 17, 2024

(54) RESTORATION OF A KINETIC EVENT USING VIDEO

(71) Applicant: INTERNATIONAL BUSINESS MACHINES CORPORATION, Armonk, NY (US)

(72) Inventors: Nuo Xu, Hangzhou (CN); Yuan Yuan Ding, Shanghai (CN); Ke Yong Zhang, Shanghai (CN); Tian Tian Chai, Beijing (CN); Yi Chen Zhong, Shanghai (CN); Hong Bing Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 17/814,938

(22) Filed: Jul. 26, 2022

(65) Prior Publication Data
US 2024/0037825 A1   Feb. 1, 2024

(51) Int. Cl.
G06T 13/20        (2011.01)
G06T 7/246        (2017.01)
G06T 19/00        (2011.01)

(52) U.S. Cl.
CPC .............. G06T 13/20 (2013.01); G06T 7/248 (2017.01); G06T 19/00 (2013.01); G06T 2207/10016 (2013.01); G06T 2207/10028 (2013.01); G06T 2219/004 (2013.01)

(58) Field of Classification Search
CPC ......... G06T 13/20; G06T 7/248; G06T 19/00; G06T 2207/10016; G06T 2207/10028; G06T 2219/004; G06Q 10/10; G06Q 40/08; G06Q 50/18; G06Q 50/26; G06Q 50/40
See application file for complete search history.

(56) References Cited

U.S. PATENT DOCUMENTS

| 9,098,753 | B1* | 8/2015 | Zhu ..................... G05D 1/0246 |
| 9,607,226 | B2* | 3/2017 | Zhu ....................... G06V 20/56 |
| 10,417,816 | B2* | 9/2019 | Satzoda ................. G06F 18/24 |
| 10,528,851 | B2* | 1/2020 | Zhu .......................... G06T 7/11 |
| 10,884,409 | B2* | 1/2021 | Mercep .................. G06F 18/29 |
| 11,068,995 | B1  | 7/2021 | Potter |

(Continued)

FOREIGN PATENT DOCUMENTS

| CN | 105046731 A | 11/2015 |
| CN | 112132993 A | 12/2020 |

(Continued)

OTHER PUBLICATIONS

Mell et al., "The NIST Definition of Cloud Computing", National Institute of Standards and Technology, Special Publication 800-145, Sep. 2011, pp. 1-7.

Primary Examiner — Vijay Shankar
(74) Attorney, Agent, or Firm — Michael O'Keefe

(57) ABSTRACT

A method for restoration of a kinetic event using video. The method includes obtaining video involving the kinetic event including a plurality of frames. An absolute location of a frame of the plurality of frames is determined. Movement of a feature point cloud corresponding to an object in motion in the plurality of frames is analyzed. A 3D object model with substantially similar dimensions to the object in motion is selected. The 3D object model is displayed emulating the analysed movement on the 3D map based on the absolute location.

20 Claims, 9 Drawing Sheets

(56) References Cited

U.S. PATENT DOCUMENTS

| | | | |
|---|---|---|---|
| 11,210,859 B1 * | 12/2021 | Fredericks | G06T 7/62 |
| 11,815,623 B2 * | 11/2023 | Deng | G01S 13/865 |
| 2015/0029308 A1 | 1/2015 | Han et al. | |
| 2018/0365888 A1 * | 12/2018 | Satzoda | G05D 1/0251 |
| 2022/0044024 A1 | 2/2022 | Sambo | |

FOREIGN PATENT DOCUMENTS

| | | |
|---|---|---|
| TW | 630132 B | 7/2018 |
| WO | 2018147329 A1 | 8/2018 |

* cited by examiner

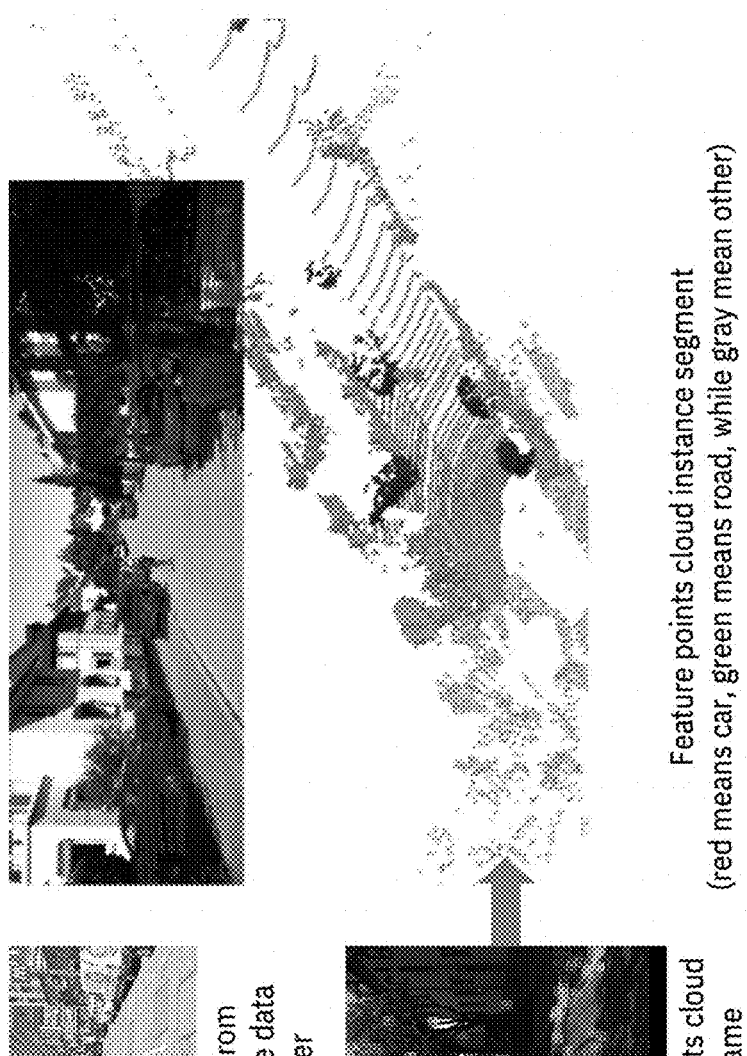

Step 2

Scene Understanding – 3D Construction

In the previous step, we have gotten the absolute position of the vehicle using the Google Street Map. However, such a position is only a static point without any dynamic data, so the next step is to rebuild the feature point cloud. Most automobile data recorders can record video but no IMU data like gyroscope or accelerometer. One SLAM algorithm called ORB-SLAM2 might be the best choice since it only depends on visual data.

The ORB-SLAM2 can bring us a sparse map from each frame. When we play the video, we can have dynamic feature points to track the motion movement of the vehicle. Meanwhile, we have to do the instance segment of each frame to ignore unnecessary data.

A frame from automobile data recorder

Feature points cloud of this frame

Feature points cloud instance segment
(red means car, green means road, while gray mean other)

FIG. 2B

Step 3

Car 6DOF detection

After getting the feature points cloud which belongs to the vehicle, we can get its general shape, size, 6 degrees of free, color, and brand. One of the 3D models (usually an obj file) from our database will replace the cloud.
When we play the video, the feature points cloud becomes dynamic.
Then we can find out how the 3D model moves, including its speed, displacement, etc.

FIG. 2C

Step 4

3D Accident
Process
Restore &
Analysis

The last step is to put the 3D model back into the Google Map. When the user drags the map, he can view the accident in various views and timestamps.

RESTORATION OF A KINETIC EVENT USING VIDEO

BACKGROUND

Exemplary embodiments of the present inventive concept relate to visualization of a kinetic event, and more particularly, to restoration of a kinetic event using video.

When a kinetic event occurs, such as a car accident, involved parties (e.g., drivers, pedestrians, passengers, etc.) often offer differing accounts of the events that precipitated the kinetic event. Consequently, in the case of a car accident, video is manually reviewed by various interested parties. However, different video source perspectives (e.g., car 1, car 2, pedestrian, passenger, traffic camera, etc.) may lead to inconsistent inferences of fault among the involved parties. However, at present, video from different sources cannot be consolidated into a comprehensive visualization for evaluation. In some instances, there is also no traffic camera available at the scene of the car accident, hindering an aerial visualization of the car accident. Animation re-enactments of car accidents can be produced, but these animations rely on replication by generalization rather than restoration. Furthermore, they are often self-serving because they are commissioned by involved parties based on the video or rendering that is most consistent with their account. Thus, car accident animations are often biased and imprecise.

SUMMARY

Exemplary embodiments of the present inventive concept relate to a method, a computer program product, and a system for kinetic event restoration using video.

According to an exemplary embodiment of the present inventive concept, a method is provided for kinetic event restoration using video. The method includes obtaining video involving the kinetic event including a plurality of frames. An absolute location of a frame of the plurality of frames is determined. Movement of a feature point cloud corresponding to an object in motion in the plurality of frames is analyzed. A 3D object model with substantially similar dimensions to the object in motion is selected. The 3D object model is displayed emulating the analysed movement on the 3D map based on the absolute location.

According to an exemplary embodiment of the present inventive concept, a computer program product is provided for kinetic event restoration using video. The computer program product includes one or more non-transitory computer-readable storage media and program instructions stored on the one or more non-transitory computer-readable storage media capable of performing a method. The method includes obtaining video involving the kinetic event including a plurality of frames. An absolute location of a frame of the plurality of frames is determined. Movement of a feature point cloud corresponding to an object in motion in the plurality of frames is analyzed. A 3D object model with substantially similar dimensions to the object in motion is selected. The 3D object model is displayed emulating the analysed movement on the 3D map based on the absolute location.

According to an exemplary embodiment of the present inventive concept, a computer system is provided for kinetic event restoration using video. The system includes one or more computer processors, one or more computer-readable storage media, and program instructions stored on the one or more of the computer-readable storage media for execution by at least one of the one or more processors capable of performing a method. The method includes obtaining video involving the kinetic event including a plurality of frames. An absolute location of a frame of the plurality of frames is determined. Movement of a feature point cloud corresponding to an object in motion in the plurality of frames is analyzed. A 3D object model with substantially similar dimensions to the object in motion is selected. The 3D object model is displayed emulating the analysed movement on the 3D map based on the absolute location.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 2B illustrates generating feature point clouds for a plurality of features, including the object in motion.

FIG. 2C illustrates analyzing movement for at least one object in motion, in accordance an exemplary embodiment of the present inventive concept.

Figure 1:
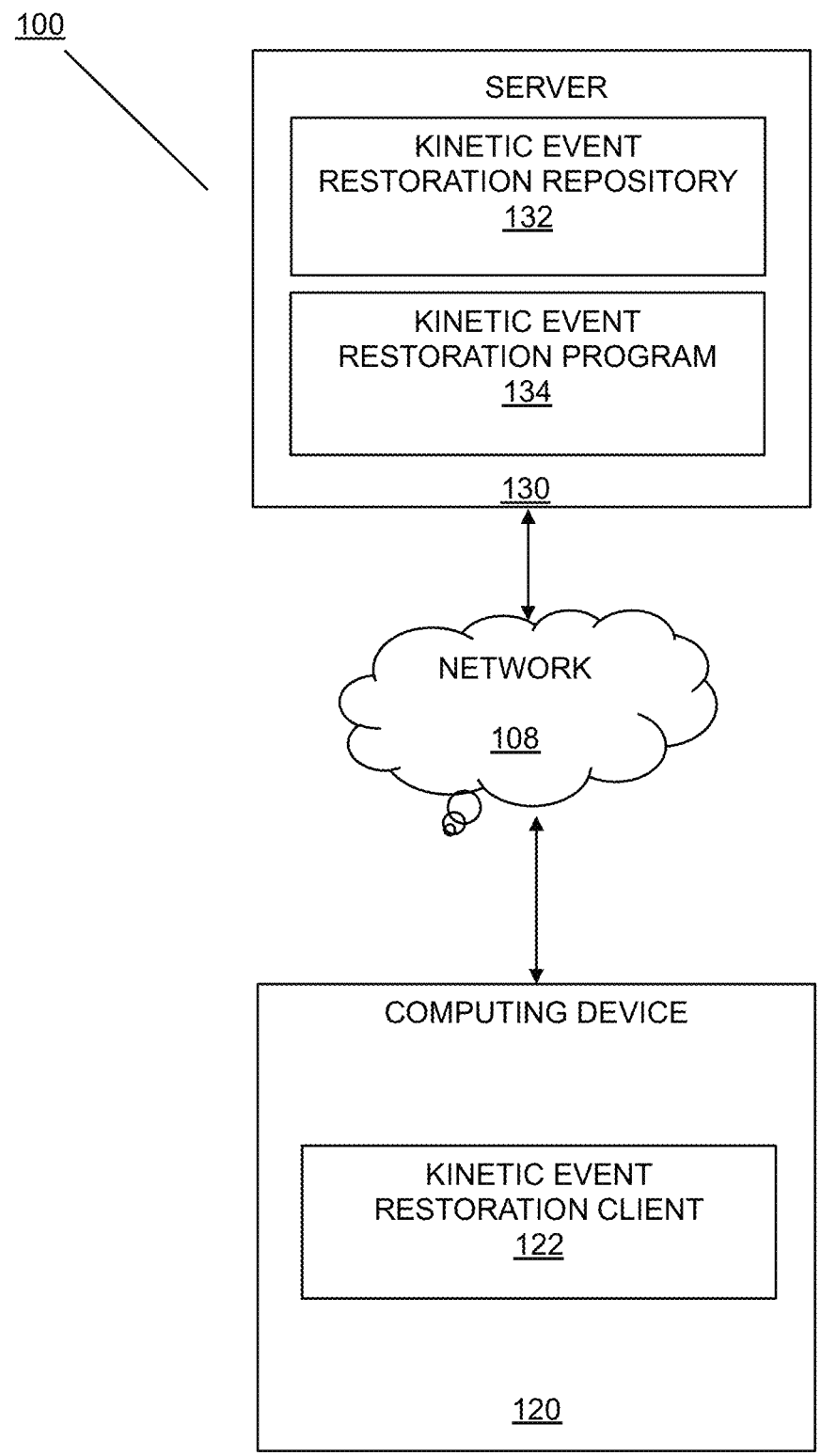
FIG. 1 illustrates a schematic diagram of a kinetic event restoration system 100, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As aforementioned, relying solely on video and/or animation replication to deduce the faults of involved parties in a car accident presents limitations. The present inventive concept relates to kinetic event restoration using video. Thus, the precise events precipitating a kinetic event, such as a car accident, may be dynamically visualized in a 3D map with clarity, angles, consolidation, and/or perspectives otherwise unavailable. Moreover, the present inventive concept enables multi-source video to be incorporated into a single visualization, thereby providing enhanced accuracy and a more complete assessment of the actions of the involved parties. Although the embodiments provided herein are described with respect to restoration of car accidents, the present inventive concept is not limited thereto. For example, the present inventive concept may be applied in any other context involving a kinetic event relating to at least one object in motion.

FIG. 1 depicts a kinetic event restoration system 100, in accordance with an exemplary embodiment of the present inventive concept.

The kinetic event restoration system 100 may include a computing device 120 and a kinetic event restoration server 130, which may all be interconnected via a network 108. Programming and data content may be stored and accessed remotely across several servers via the network 108. Alternatively, programming and data may be stored locally on as few as one physical computing device 120 or stored amongst multiple computing devices.

According to the exemplary embodiment of the present inventive concept depicted in FIG. 1, the network 108 may be a communication channel capable of transferring data between connected devices. The network 108 may be the Internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

The computing device 120 may include a kinetic event restoration client 122, and may be a traffic/security camera, dashcam, vehicle computing system, an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. The computing device 120 may be equipped with a microphone, a camera, and/or movement sensors (e.g., accelerometer, gyroscope, LIDAR, etc.). The computing device 120 may be a speech recognition equipped smart device. Although the computing device 120 is shown as a single device, the computing device 120 may be comprised of a cluster or plurality of computing devices, in a modular manner, etc., working together or working independently.

Figure 3:
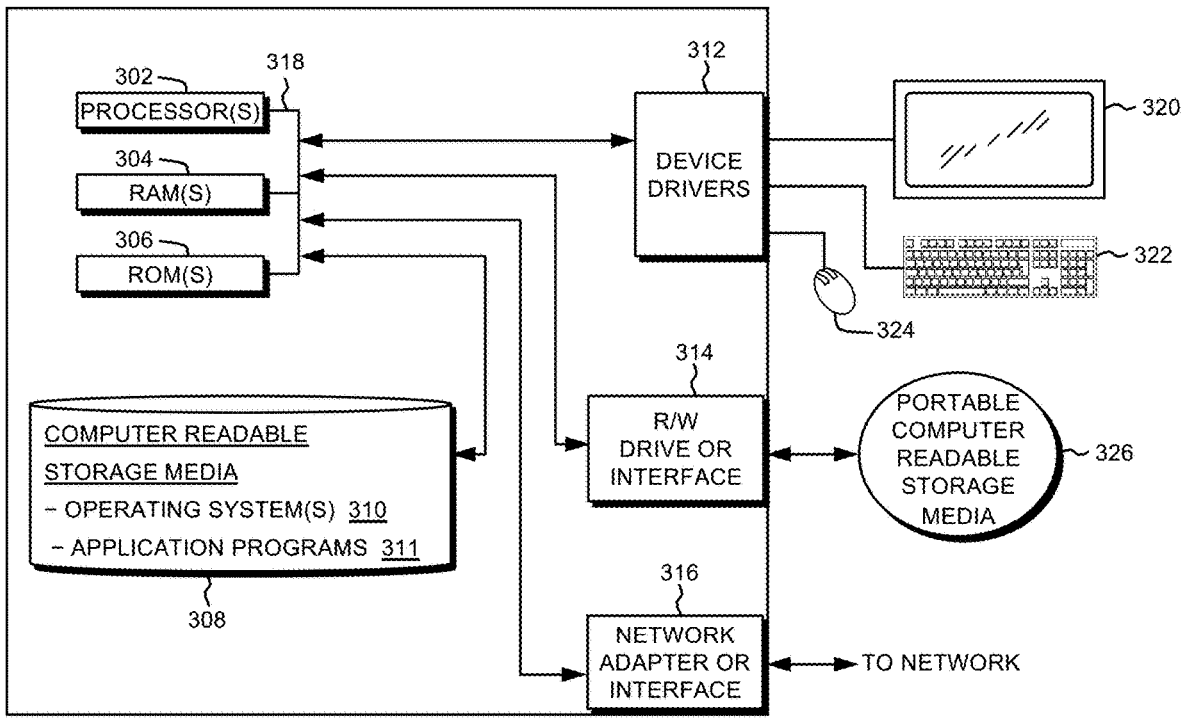
FIG. 3 illustrates a block diagram depicting the hardware components included in the kinetic event restoration system 100 of FIG. 1, in accordance with an exemplary embodiment of the present inventive concept.
Figure 4:
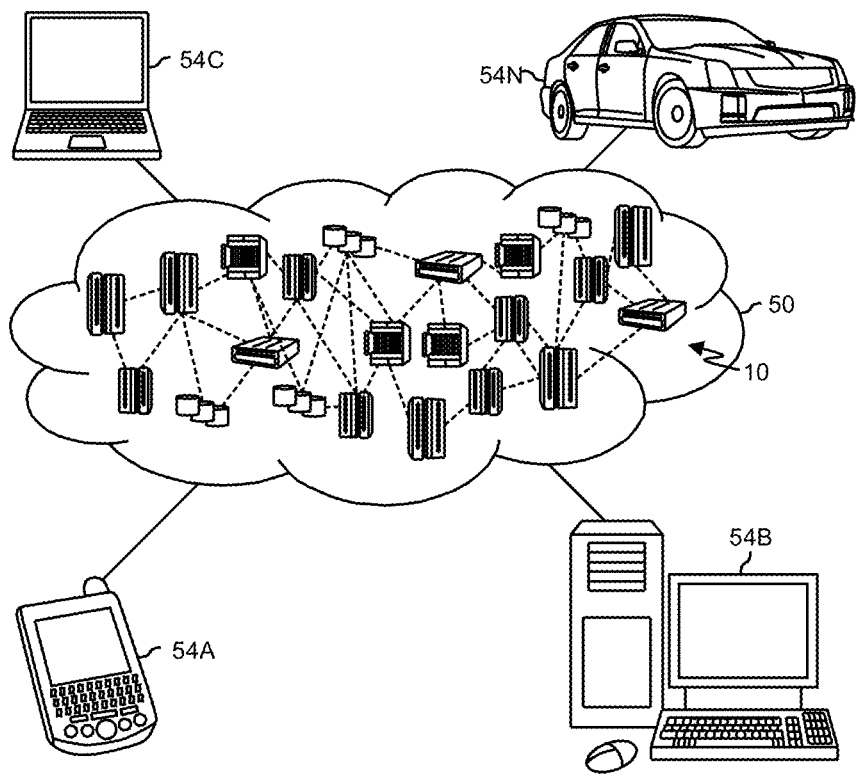
FIG. 4 illustrates a cloud computing environment, in accordance with an exemplary embodiment of the present inventive concept.
Figure 5:
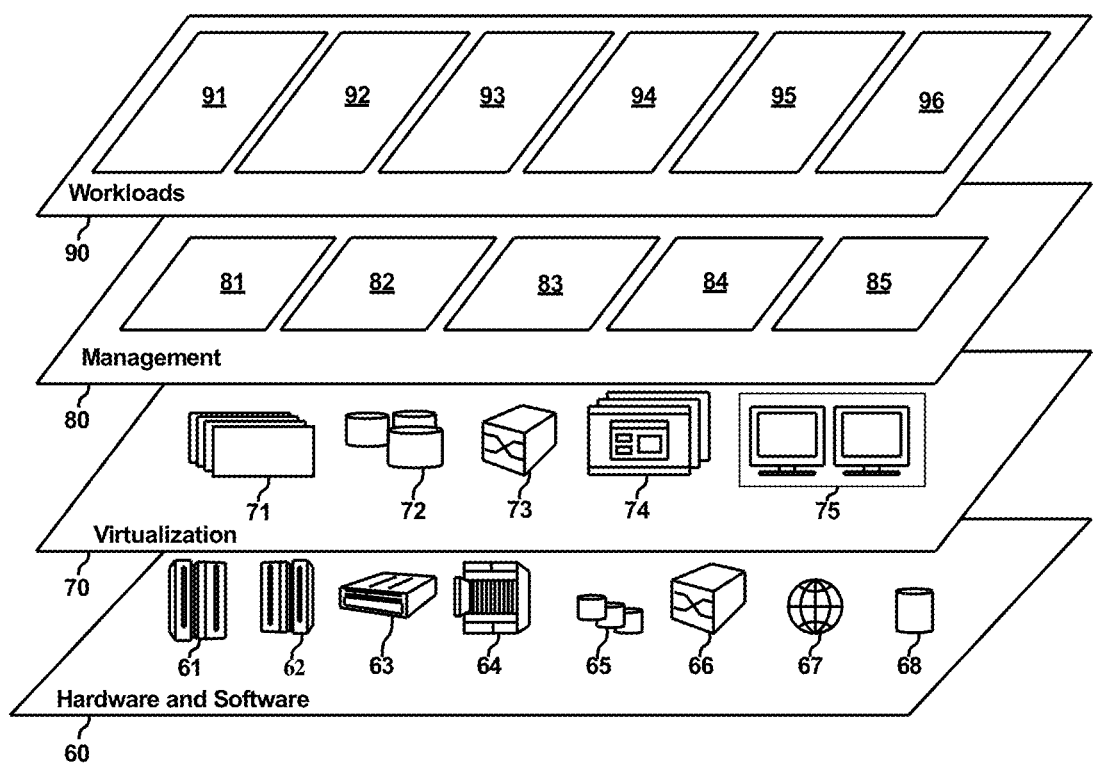
FIG. 5 illustrates abstraction model layers, in accordance with an exemplary embodiment of the present inventive concept.

The computing device 120 is described in greater detail as a hardware implementation with reference to FIG. 3, as part of a cloud implementation with reference to FIG. 4, and/or as utilizing functional abstraction layers for processing with reference to FIG. 5.

The kinetic event restoration client 122 may act as a client in a client-server relationship with a server, for example the kinetic event restoration server 130. The kinetic event restoration client 122 may be a software and/or a hardware application capable of communicating with and providing a user interface for a user to interact with the kinetic event restoration server 130 and/or other computing devices via the network 108. Moreover, the kinetic event restoration client 122 may be capable of transferring data between the computing device 120 and other computer devices/servers via the network 108. The kinetic event restoration client 122 may utilize various wired and wireless connection protocols for data transmission and exchange, including Bluetooth, 2.4 GHz and 5 GHz internet, near-field communication, etc. The kinetic event restoration client 122 is described in greater detail with respect to FIGS. 2-5.

The kinetic event restoration server 130 may include a kinetic event restoration repository 132 for storing various data (e.g., video (raw and annotated), kinetic event restoration models, visualizations of kinetic event restorations, object in motion models, feature point cloud data, kinetic event restoration computations, absolute locations, 3D maps, causation assessments, etc.) and kinetic event restoration program 134. The kinetic event restoration program 134 may obtain video that includes the kinetic event; determine an absolute location of a video frame; analyze movement for at least one object in motion; and display the object in motion emulating the analyzed movement on a 3D map based on the absolute location. The kinetic event restoration server 130 may act as a server in a client-server relationship with a client (e.g., the kinetic event restoration client 122). The kinetic event restoration server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. Although the kinetic event restoration server 130 is shown as a single computing device, the present inventive concept is not limited thereto. For example, the kinetic event restoration server 130 may be comprised of a cluster or plurality of computing devices, in a modular manner, etc., working together or working independently.

The kinetic event restoration server 130 is described in greater detail as a hardware implementation with reference to FIG. 3, as part of a cloud implementation with reference to FIG. 4, and/or as utilizing functional abstraction layers for processing with reference to FIG. 5. The kinetic event restoration program 134 and/or the kinetic event restoration client 122 may be software and/or hardware programs that may facilitate kinetic event restoration using video as discussed in further detail with reference to FIGS. 2-5.

Figure 2:
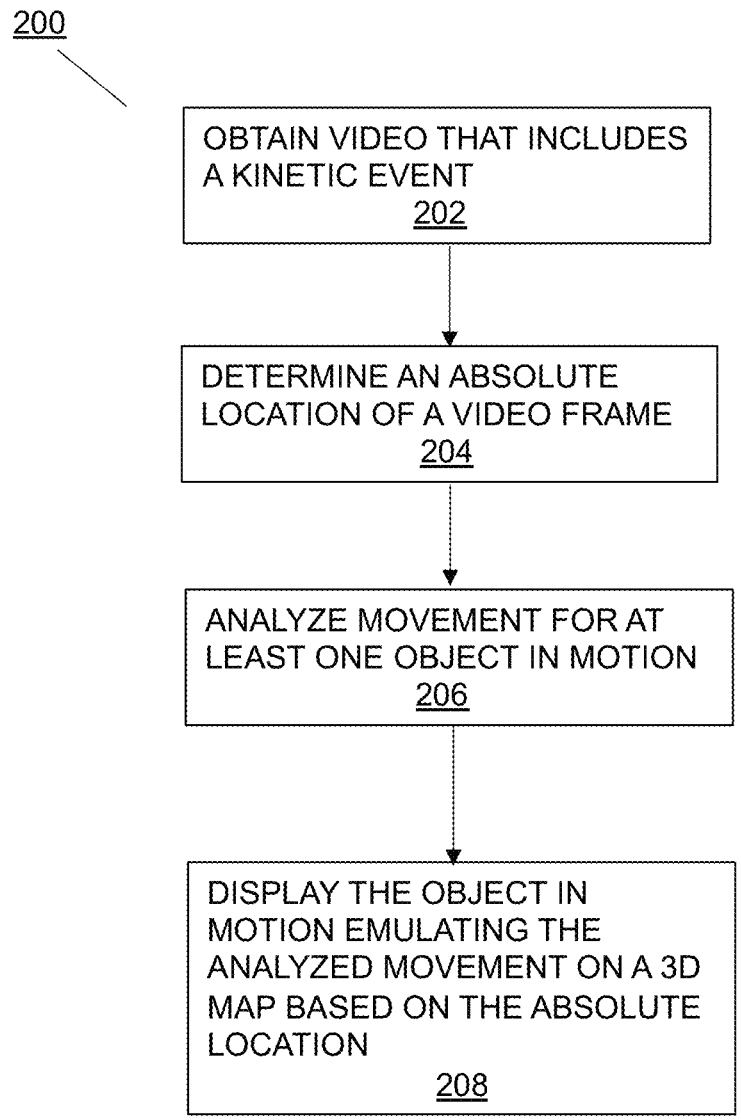
FIG. 2 illustrates a flowchart of kinetic event restoration 200, in accordance with an exemplary embodiment of the present inventive concept.

FIG. 2 illustrates the flowchart of kinetic event restoration 200, in accordance with an exemplary embodiment of the present inventive concept.

The kinetic event restoration program 134 may obtain video that includes a kinetic event (step 202). If available, data from accelerometers, GPS (global positioning system), noise, speech, vibration sensors, vehicular sensory systems, etc. may also be obtained and used in subsequent steps. A kinetic event may refer to any occurrence involving at least one object in motion. For example, the kinetic event may refer to a collision, such as a car accident. The at least one object in motion may be a vehicle (e.g., car, boat, motorcycle, bicycle, plane, train, etc.), a projectile (e.g., thrown sporting ball, loosed debris post-collision, hail, wind tossed objects, etc.), and/or a mobile entity (e.g., a pedestrian, rollerblader, bird, deer, etc.). Multiple videos of a same kinetic event may be transmitted to the kinetic event restoration program 134. The video may be obtained by a computing device 120 (e.g., upon detection of a kinetic event) and/or uploaded by a user. Once a kinetic event is recognized (e.g., via detection and/or user input), video may be aggregated for a same kinetic event based video and/or other data from a relevant time and proximity. The computing device 120 transmitting the video may include a traffic camera, a trip recorder (TripREC), and/or a cell phone. The video may include a plurality of frames. The plurality of frames may correspond to time stamps and/or GPS coordinates. At least some of the plurality of frames may correspond to a segment of the video (e.g., a timespan) that includes the kinetic event. The segment of the video may also include a scene of the kinetic event or an adjacent area prior to and/or after the kinetic event by a predetermined threshold.

In an embodiment, the time span/stamp, object in motion, and/or the frames depicting the kinetic event may be flagged by the user and/or the kinetic event restoration program 134 based on the analyzed movement for the at least one object in motion discussed below with reference to step 206. The kinetic event restoration program 134 may, for example, detect a kinetic event from streaming video footage from a computing device 120 on scene. The kinetic event restoration program 134 may edit the video by isolating at least one segment of the video that includes the kinetic event. The kinetic event restoration program may also splice together non-continuous time segments of the video (e.g., a time span before, after, and/or during the kinetic event) as flagged by the user and/or the kinetic event restoration program 134. For example, post-kinetic event video may not be relevant to kinetic event restoration (e.g., the objects in motion are subsequently at rest, exhibiting a substantially reduced velocity, and/or no further kinetic events occur in the video). Similarly, pre-kinetic event segments of the video may also not be relevant (e.g., timespans spent at traffic lights). In the event of multiple kinetic events separated by a predetermined length of time, the kinetic event restoration program 134 may combine the relevant time spans. The video may be stored in the kinetic event restoration repository 132.

For example, the kinetic event restoration program may receive video including a car accident involving two cars from a TripREC and a nearby traffic camera.

The kinetic event restoration program 134 may determine an absolute location of a video frame (step 204). The absolute location may be determined by matching the video frame to a substantially similar image in a 3D map (e.g., Google Maps) using many-to-many image comparison and/or object recognition. The kinetic event restoration program 134 may hone in on a general area of the 3D map based on a range of GPS coordinates (if available), a known location (e.g., address) associated with the computing device 120, and/or user input. The kinetic event restoration program 134 may retrieve a plurality of scored matches for at least one video frame. The candidate video frames to determine the absolute location may include any obtained video that includes the kinetic event. The video frame may be selected arbitrarily, based on a best available match, based on best resolution/clarity, and/or based on a time span (e.g., selected by the user or based on kinetic event detection). The kinetic event restoration program 134 may retrieve the GPS coordinates for the selected 3D map image that matches the video frame.

Figure 2A:
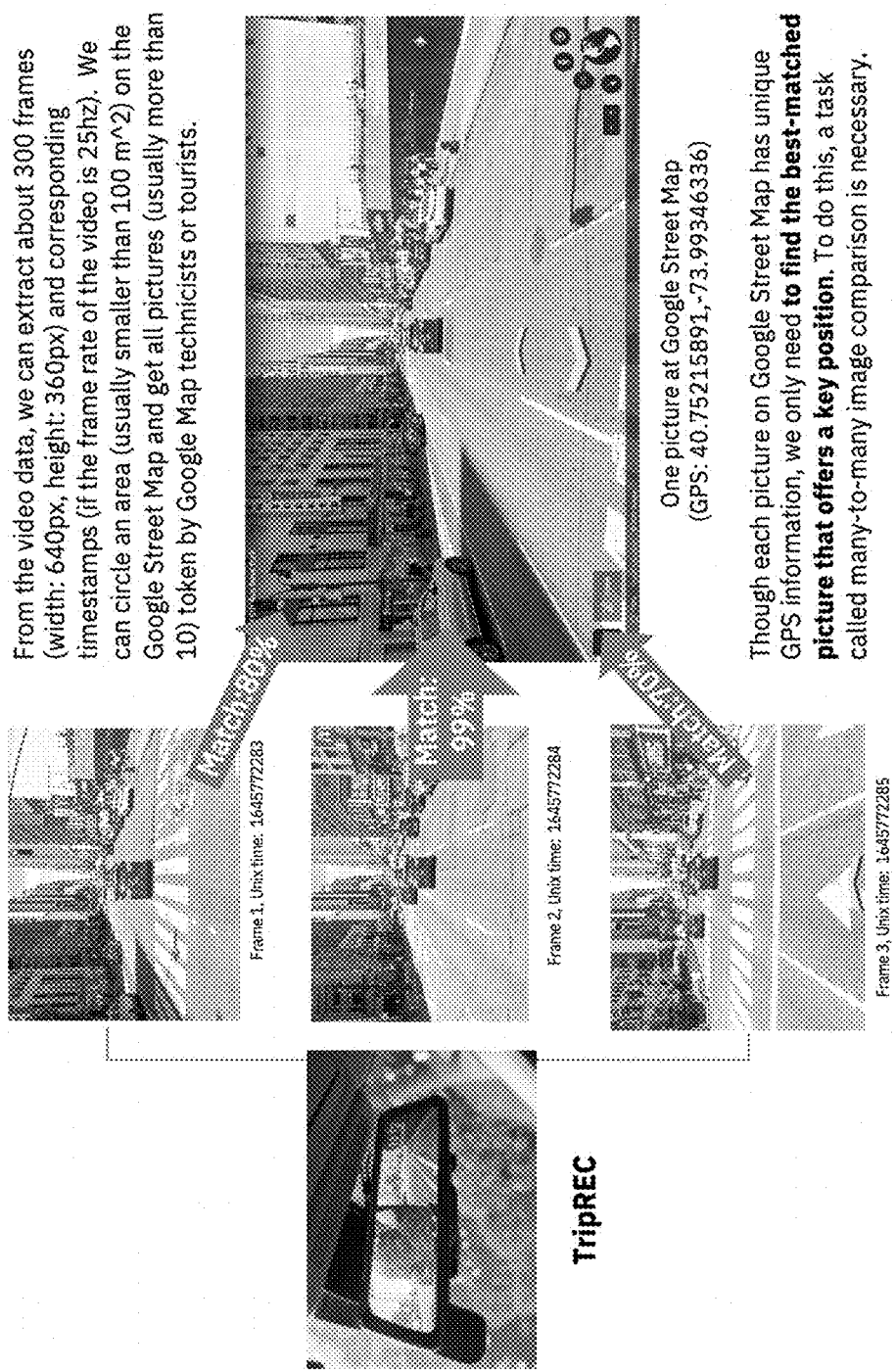
FIG. 2A illustrates determining an absolute location of a video frame, in accordance with an exemplary embodiment of the present inventive concept.

For example, with reference to FIG. 2A, the kinetic event restoration program 134 may score multiple video frames included in the obtained TripREC recording. The kinetic event restoration program 134 may select the highest ranked match (i.e., the 99% match).

The kinetic event restoration program 134 may analyse movement for at least one object in motion (step 206). The movement (e.g., displacement, trajectory, acceleration, velocity, etc.) for the at least one object in motion for the video may be analyzed by generating a plurality of feature point clouds. Each feature point cloud may correspond to a different feature in a frame (e.g., object in motion, road, lane, signs, pedestrians, miscellaneous object, etc.). In an embodiment, a Simultaneous Localization and Matching (SLAM) algorithm (e.g., ORB-SLAM2) may be used. Feature point cloud data associated with irrelevant features may be discarded (e.g., non-involved objects in motion, signs unrelated to traffic as determined by Optical Character Recognition (OCR), etc.). A feature point cloud may correspond to the at least one object in motion. The feature point cloud for the at least one object in motion may be compared to an object in motion of previously known speed (e.g., reported or radar detected) and/or a feature point cloud corresponding to another feature point cloud (e.g., a stationary reference object) in at least two different frames. The kinetic event restoration program 134 may select a 3D model corresponding to the at least one object in motion with substantially similar physical attributes. The physical attributes (e.g., shape, dimensions, 6 degrees of freedom (6DOF), color, brand, etc.) of the at least one object in motion may be determined by user input, computer vision, and/or based on the feature point cloud matching a 3D model (e.g., object file (obj file)) stored in the kinetic event restoration repository 132. The kinetic event restoration program 134 may represent (e.g., substitute) the feature point cloud corresponding to the object in motion with the 3D model. The kinetic event restoration program 134 may analyze the movement of the 3D model and/or the feature point cloud corresponding to the object in motion.

For example, FIG. 2B illustrates the plurality of feature point clouds generated by the kinetic event restoration program 134 from the obtained TripREC video. With reference to FIG. 2C, the feature point cloud corresponding to one of the cars involved in the eventual kinetic event is replaced with a representative 3D model of the same make and model based on the analyzed physical attributes. The movement of the 3D model for the car is analyzed between at least two different frames in the TripREC video in order to determine the path, speed, and displacement of the car.

The kinetic event restoration program 134 may display the object in motion emulating the analyzed movement on a 3D map based on the absolute location (step 208). The 3D model may be superimposed directly on the 3D map (e.g., an overlay). In an embodiment, a simplified 3D map may be generated based on the plurality of feature point clouds deemed relevant and represented with corresponding substantially similar 3D models. The analyzed movement of the 3D model may be synced with a plurality of corresponding locations in the 3D map using the absolute location as a reference point. The 3D map may be interactive such that a user can manipulate time (e.g., speed, fast-forward, rewind, pause, etc.) and/or space (e.g., angle of perspective, degree of magnification) from any position in the 3D map.

Step 202 to step 208 may be repeated for each obtained video of the kinetic event. Thus, a multi-source restoration may be generated. The obtained videos of the kinetic events may depict the same or different objects in motion. The multi-source restoration may include a plurality of 3D models corresponding to objects in motion, which may only be visible from certain perspectives. The kinetic event restoration program 134 may annotate frames in the kinetic event restoration. The annotations may be continuously visible, visible only when a predetermined event for a 3D model occurs (e.g., speeding, crossing double lined lanes, collision, etc.), or upon a user action (e.g., clicking, pausing, etc.). The annotations may include at least one of time stamps, GPS coordinates, measurements (e.g., distances between 3D models and/or other features), analyzed movement calculations (e.g., velocity, acceleration, trajectory, etc.), and/or an indication signifying the kinetic event occurred, location of precise contact between 3D models, and analyzed movement calculations for a predetermined time span.

In an embodiment, the kinetic event restoration program 134 may be programmed to retrieve relevant traffic statutes over the network 108 and analyze the traffic statutes using machine learning (e.g., natural language processing (NLP)). The analyzed traffic statutes and/or user input of traffic parameters may be used to appraise relative fault (e.g., initiated impact) of involved parties (e.g., drivers of different 3D models) by comparison to the information associated with the annotations.

Figure 2D:
FIG. 2D illustrates displaying the object in motion emulating the analyzed movement on a 3D map based on the absolute location, in accordance an exemplary embodiment of the present inventive concept.
Figure 2D:
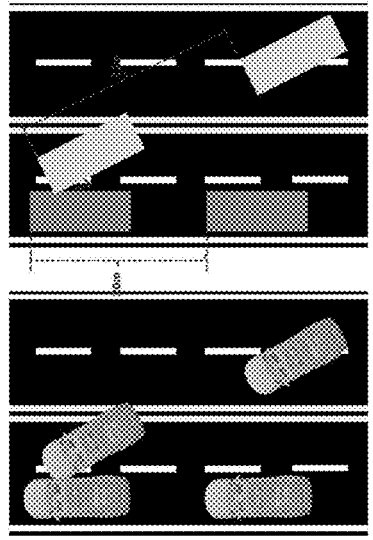

For example, with reference to FIG. 2D, the 3D model from the TripREC video is displayed performing the analyzed movement on the 3D map synced around the determined absolute location. In addition, a TripREC video from the perspective of the other involved driver undergoes kinetic event restoration as well. The 3D models of both cars performing respective analyzed movements are thus visible on the 3D map. Although the TripREC videos may have different absolute locations, corresponding time stamps are used to synchronize the videos and consolidate them into the singular 3D map. Annotations of the analysed movements are displayed. The kinetic restoration program 134 circles the collision on the 3D map and also displays a perpendicular aerial perspective with annotations (e.g., the angle of contact, trajectories and distances travelled between time stamps, etc.).

FIG. 3 illustrates a block diagram depicting the hardware components of the kinetic event restoration system 100 of FIG. 1, in accordance with an exemplary embodiment of the present inventive concept.

It should be appreciated that FIG. 3 provides only an illustration of one implementation and does not imply any limitations regarding the environments in which different embodiments may be implemented. Many modifications to the depicted environment may be made.

Devices used herein may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311 are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 314 to read from and write to one or more portable computer readable storage media 326. Application programs 311 on said devices may be stored on one or more of the portable computer readable storage media 326, read via the respective R/W drive or interface 314 and loaded into the respective computer readable storage media 308.

Devices used herein may also include a network adapter or interface 316, such as a TCP/IP adapter card or wireless communication adapter (such as a 4G wireless communication adapter using OFDMA technology). Application programs 311 on said computing devices may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Devices used herein may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 illustrates a cloud computing environment, in accordance with an exemplary embodiment of the present inventive concept.

As shown, cloud computing environment 50 may include one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and kinetic event restoration 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

The invention claimed is:

1. A computer system for restoration of a kinetic event using video, the system comprising:
one or more computer processors, one or more non-transitory computer-readable storage media, and program instructions stored on the one or more non-transitory computer-readable storage media for execution by at least one of the one or more processors capable of performing a method, the method comprising:
obtaining video involving the kinetic event, wherein the video includes a plurality of frames;
determining an absolute location of a frame of the plurality of frames;
analyzing movement of a feature point cloud corresponding to an object in motion in the plurality of frames compared to another object in motion at a known speed;
selecting a 3D object model with substantially similar dimensions to the object in motion; and
displaying the 3D object model emulating the analysed movement on a 3D map based on the absolute location.

2. The computer system of claim 1,
wherein the determining the absolute location based on the frame in the video is based on matching a frame of the video to an image in the 3D map,
wherein the kinetic event is a car accident,
wherein the object in motion is a car, and
wherein the 3D object model corresponds to a make and model of the car.

3. The computer system of claim 1, further comprising:
generating a plurality of feature point clouds for the plurality of frames in the video;
wherein the analysing the movement of the feature point cloud for the object in motion is performed relative to another feature point cloud.

4. The computer system of claim 1, wherein the 3D object model exhibiting the analysed movement on the 3D map is displayed from a different perspective of the absolute location than the perspective of the matched frame used to determine the absolute location.

5. The method of claim 1, wherein the video is plural,
wherein each video includes a different object in motion and corresponding 3D object model, and
wherein the displaying of the 3D object models exhibiting the analysed movements on the 3D map based on the absolute location are synced by time.

6. The method of claim 1, wherein the displaying the 3D object model exhibiting the analysed movement on the 3D map based on the absolute location includes annotations describing features of the analysed movement and a collision.

7. A computer program product for restoration of a kinetic event using video, the computer program product comprising:
one or more non-transitory computer-readable storage media and program instructions stored on the one or more non-transitory computer-readable storage media capable of performing a method, the method comprising:
obtaining video involving the kinetic event, wherein the video includes a plurality of frames;
determining an absolute location of a frame of the plurality of frames;
analyzing movement of a feature point cloud corresponding to an object in motion in the plurality of frames compared to another object in motion at a known speed;
selecting a 3D object model with substantially similar dimensions to the object in motion; and
displaying the 3D object model emulating the analysed movement on a 3D map based on the absolute location.

8. The computer program product of claim 7,
wherein the determining the absolute location based on the frame in the video is based on matching a frame of the video to an image in the 3D map,
wherein the kinetic event is a car accident,
wherein the object in motion is a car, and
wherein the 3D object model corresponds to a make and model of the car.

9. The computer program product of claim 7, further comprising:
generating a plurality of feature point clouds for the plurality of frames in the video;
wherein the analysing the movement of the feature point cloud for the object in motion is performed relative to another feature point cloud.

10. The method of claim 7, wherein the 3D object model exhibiting the analysed movement on the 3D map is displayed from a different perspective of the absolute location than the perspective of the matched frame used to determine the absolute location.

11. The method of claim 7, wherein the video is plural, wherein each video includes a different object in motion and corresponding 3D object model, and
wherein the displaying of the 3D object models exhibiting the analysed movements on the 3D map based on the absolute location are synced by time.

12. The method of claim 7, wherein the displaying the 3D object model exhibiting the analysed movement on the 3D map based on the absolute location includes annotations describing features of the analysed movement and a collision.

13. The method of claim 12, wherein the annotations include indications relating to deviations from analysed traffic regulations.

14. A method for restoration of a kinetic event using video, the method comprising:
obtaining video involving the kinetic event, wherein the video includes a plurality of frames;
determining an absolute location of a frame of the plurality of frames;
analyzing movement of a feature point cloud corresponding to an object in motion in the plurality of frames compared to another object in motion at a known speed;
selecting a 3D object model with substantially similar dimensions to the object in motion; and
displaying the 3D object model emulating the analysed movement on a 3D map based on the absolute location.

15. The method of claim 1,
wherein the determining the absolute location based on the frame in the video is based on matching a frame of the video to an image in the 3D map,
wherein the kinetic event is a car accident,
wherein the object in motion is a car, and
wherein the 3D object model corresponds to a make and model of the car.

16. The method of claim 1, further comprising:
generating a plurality of feature point clouds for the plurality of frames in the video;
wherein the analysing the movement of the feature point cloud for the object in motion is performed relative to another feature point cloud.

17. The method of claim 1, wherein the 3D object model exhibiting the analysed movement on the 3D map is displayed from a different perspective of the absolute location than the perspective of the matched frame used to determine the absolute location.

18. The method of claim 1, wherein the video is plural, wherein each video includes a different object in motion and corresponding 3D object model, and
wherein the displaying of the 3D object models exhibiting the analysed movements on the 3D map based on the absolute location are synced by time.

19. The method of claim 1, wherein the displaying the 3D object model exhibiting the analysed movement on the 3D map based on the absolute location includes annotations describing features of the analysed movement and a collision.

20. The method of claim 19, wherein the annotations include indications relating to deviations from analysed traffic regulations.

* * * * *